United States Patent
Dong et al.

(10) Patent No.: US 8,218,038 B2
(45) Date of Patent: Jul. 10, 2012

(54) MULTI-PHASE BLACK LEVEL CALIBRATION METHOD AND SYSTEM

(75) Inventors: Nguyen Dong, Irvine, CA (US); Amit Mittra, Irvine, CA (US); Ray-Chi Chang, Irvine, CA (US)

(73) Assignee: Himax Imaging, Inc., Tainan (TW)

( * ) Notice: Subject to any disclaimer, the term of this patent is extended or adjusted under 35 U.S.C. 154(b) by 333 days.

(21) Appl. No.: 12/635,711

(22) Filed: Dec. 11, 2009

(65) Prior Publication Data
US 2011/0141291 A1 Jun. 16, 2011

(51) Int. Cl.
*H04N 9/64* (2006.01)

(52) U.S. Cl. ........................................ 348/243

(58) Field of Classification Search ............... 348/222.1, 348/241, 243, 245, 250, 251, 257
See application file for complete search history.

(56) References Cited

U.S. PATENT DOCUMENTS

| | | | |
|---|---|---|---|
| 7,259,787 B2 | 8/2007 | McDermott | |
| 7,889,251 B1 * | 2/2011 | Ng et al. | 348/257 |
| 7,982,784 B2 * | 7/2011 | Oten et al. | 348/241 |
| 8,023,762 B2 * | 9/2011 | Rhee | 382/260 |
| 2006/0158562 A1 * | 7/2006 | Rhee | 348/607 |
| 2008/0158396 A1 * | 7/2008 | Fainstain et al. | 348/246 |
| 2009/0278962 A1 * | 11/2009 | Richardson et al. | 348/241 |
| 2010/0039537 A1 * | 2/2010 | Oten et al. | 348/241 |

* cited by examiner

*Primary Examiner* — Nicholas Giles
(74) *Attorney, Agent, or Firm* — Su IP Consulting (57) ABSTRACT

Multi-phase black level calibration (BLC) methods and systems are generally disclosed. According to one embodiment of the present invention, an image sensor comprises a pixel sensor array, a timing generator, and a front-end processing block. The front-end processing block also includes a first summing junction, a first BLC block, and a second BLC block. According to a first timing signal from the timing generator, the first BLC block is configured to iteratively generate a first calibration signal in a first phase based on a first set of adjusted black level signals associated with a first set of black pixels, a changing accumulator step, and a predetermined condition associated with a first target black level. According to a second timing signal from the timing generator, the second BLC block is configured to generate a second calibration signal for a second summing junction to apply to an image signal associated with one or more active pixels in the frame in a second phase.

20 Claims, 8 Drawing Sheets

MULTI-PHASE BLACK LEVEL CALIBRATION METHOD AND SYSTEM

CROSS-REFERENCE TO RELATED APPLICATIONS

This application is related to U.S. patent application Ser. No. 12/582,715, entitled "BLACK LEVEL CALIBRATION METHOD AND SYSTEM," filed on Oct. 21, 2009.

BACKGROUND

1. Field of the Invention

The present invention generally relates to image processing, and more particularly to a black level calibration method and system.

2. Description of the Related Art

Unless otherwise indicated herein, the approaches described in this section are not prior art to the claims in this application and are not admitted to be prior art by inclusion in this section.

An image sensor such as a complementary metal-oxide-semiconductor (CMOS) sensor or a charge-coupled device (CCD) sensor is often made up of an array of individual pixel sensors, each of which is configured to collect photons incident on the image sensor. The number of photons collected in each pixel sensor is converted into an electrical charge by a photodiode. This charge is then converted into an analog voltage, which may be amplified, adjusted, and converted to a digital value by an analog-to-digital converter, so that the information obtained from the individual pixel sensors can be processed, usually by a digital signal processor, into a final digital image.

Most image sensors require some form of calibration before use so that the data obtained from the image sensors can be used to produce digital images that faithfully reproduce the optical characteristics (e.g., intensity and color) of the scene or object whose image was captured. One type of calibration is referred to as black level calibration, which effectively sets a threshold below which digital data values obtained from the image sensor will be considered to represent a black level, or to represent the absence or substantial absence of light. Accurate black-level calibration helps to achieve a digital picture with full contrast and subtle details in dark shadow regions. If the black level is too low, information in dark areas may be lost. Conversely, if the black level is too high, signal range may be sacrificed.

In conventional systems, a border of an array of pixel sensors is surrounded with a number of rows and columns of light shielded, or black, pixels. These pixels may provide black reference information or black pixel data, which may be utilized to stabilize downstream image processing and to establish the correct black value in an output image.

Traditionally, the black pixel data may be indiscriminately grouped together for black level calibration. Thus, the calibrated black level may be accurate for some of the pixels but not for the other pixels. Moreover, conventional systems often fail to take into account bad black pixels, which are associated with data that may be either significantly larger than or smaller the other black pixel data. The calibrated black level may as a result become skewed and unreliable.

SUMMARY OF THE INVENTION

One embodiment of the present invention may generally relate to a multi-phase black level calibration method. The method may include performing an iteration of filtering an outlier from a first set of digital values corresponding to a first set of adjusted black level signals, wherein the first set of adjusted black level signals are associated with a first subset of a first set of black pixels in a frame, calculating a first average value based on the first set of filtered digital values, determining whether to modify an accumulator step based on the first average value and a first target black level, determining a calibration offset based on the accumulator step and a difference between the first average value and the first target black level, and generating a first calibration signal based on the calibration offset for a second subset of the first set of black pixels. The method may repeat the iteration for the first set of black pixels until a predetermined condition is met.

Another embodiment of the present invention may generally relate to a front-end processing block having a first black level calibration (BLC) block and a second BLC block configured to process a black level signal in a frame. The first BLC block may include a first level average, a first comparator, an accumulator, a digital-to-analog converter (DAC), and a level integrator. The first BLC block may be configured to continue processing the black level signal in the frame until a predetermined condition is met in a first phase calibration.

In still another embodiment of the present invention may generally relate to an image sensor configured to perform multi-phase BLC. The image sensor may include a pixel sensor array configured to output a first set of black pixels and a second set of black pixels in the frame, a timing generator, and a front-end processing block having a first summing junction, a first BLC block, and a second BLC block. According to a first timing signal from the timing generator, the first BLC block may be configured to iteratively generate a first calibration signal in a first phase calibration based on a first set of adjusted black level signals associated with the first set of black pixels, a changing accumulator step, and a predetermined condition associated with a first target black level. According to a second timing signal from the timing generator, the second BLC block may be configured to generate a second calibration signal for a second summing junction to apply to one or more active pixels in the frame in a second phase calibration based on a second target black level and a second set of black level signals associated with the second set of black pixels, wherein the second set of black level signals are adjusted by the first calibration signal and are filtered.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present invention will become more fully apparent from the following description and appended claims, taken in conjunction with the accompanying drawings. These drawings depict only several embodiments in accordance with the invention and are therefore not to be considered limiting of its scope. The invention will be described with additional specificity and detail through use of the accompanying drawings.

DETAILED DESCRIPTION

Various embodiments are described hereinafter with reference to the figures. It should be noted that the figures are not drawn to scale. It should also be noted that the figures are only intended to facilitate the description of embodiments. They are not intended as an exhaustive description of the present invention or as a limitation on the scope of the present invention. In addition, an aspect described in conjunction with a particular embodiment is not necessarily limited to that embodiment and can be practiced in any other embodiments.

Throughout this disclosure, the term "pixel" is generally used to refer to a photosensor element, such as a pixel sensor. The term "frame" is generally used to refer to a still image captured by a pixel sensor array.

Figure 1:
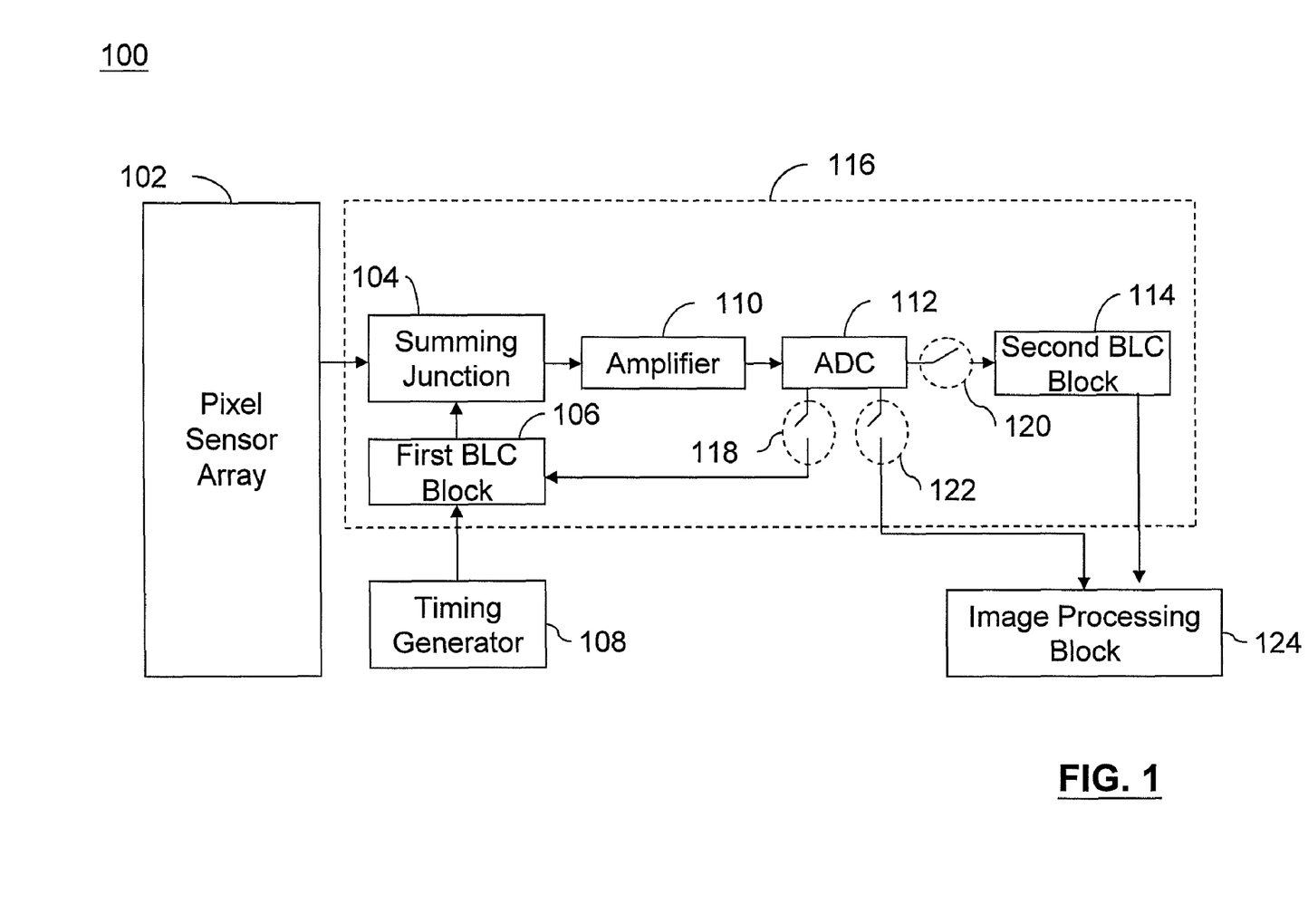
FIG. 1 is a simplified block diagram of an example image sensor, according to one embodiment of the present invention.

FIG. 1 is a simplified block diagram of an example image sensor 100, according one embodiment of the present invention. The image sensor 100 may include, without limitation, a pixel sensor array 102, a summing junction 104, a first black level calibration (BLC) block 106, a timing generator 108, an amplifier 110, an analog-to-digital converter (ADC) 112, a second BLC block 114, and an image processing block 124. The summing junction 104, the first BLC block 106, the amplifier 110, the ADC 112, and the second BLC block 114 may be some of the components in a front-end processing block 116. In addition, the timing generator 108 is configured to direct the output of the ADC 112 by controlling one or more switches, such as a switch 118, a switch 120, and a switch 122.

In one implementation, the pixel sensor array 102 is configured to collect photons incident on the image sensor 100 and convert the collected photons into electrical charges and analog voltages. To calibrate black pixels, the analog voltages outputted by the pixel sensor array 102 are adjusted by a first calibration signal generated by the first BLC block 106 via the summing junction 104. The calibration performed by the first BLC block 106 may correspond to a first phase calibration. The adjusted analog voltages are amplified by the amplifier 110 and then converted to one or more digital values by the ADC 112. When the switch 122 is closed and the switch 118 and the switch 120 are opened (e.g., the one or more digital values outputted by the ADC 112 correspond to the active pixels of the pixel sensor array 102), the image processing block 124 is configured to take into account one or more video timing signals (e.g., vertical synchronization, horizontal synchronization, and others) and operate on the one or more digital values to output a final image. On the other hand, when the switch 120 is closed and the switch 118 and the switch 122 are opened, the second BLC block 114 in one implementation is configured to further fine tune the results of the first phase calibration, generate a second calibration signal, and apply the second calibration signal to the digital values corresponding to the active pixels of the pixel sensor array 102. One of the functions of the timing generator 108 is to assert one or more timing signals to the front-end processing block 116 to initiate one or more phases of the BLC operations to be performed. Subsequent discussions found herein will further detail the one or more phases of operations associated with the first BLC block 106 and the second BLC block 114.

Figure 2:
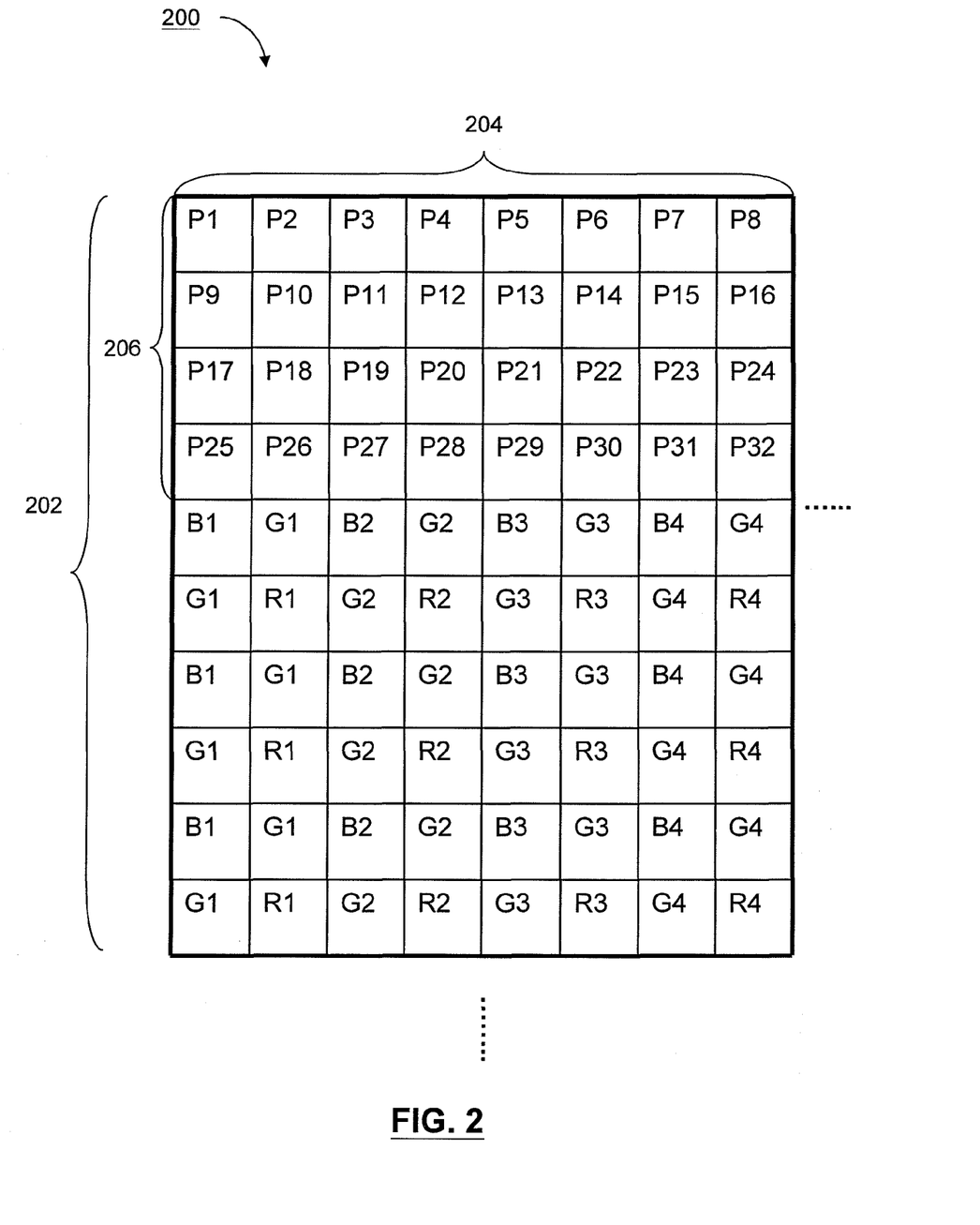
FIG. 2 is a schematic diagram of an example pixel sensor array.

FIG. 2 is a schematic diagram of an example pixel sensor array 200, which includes a two-dimensional array having multiple pixels arranged in rows 202 and columns 204. The pixel sensor array 200, which may correspond to the pixel sensor array 102 of FIG. 1, includes rows of black pixels 206. The black pixels 206 are configured to prevent light from reaching the light detection portion of the pixels. The pixel sensor array 200 also includes rows of active pixels, such as red (R), green (G), and blue (B) pixels. Although the illustrated pixel sensor array is regularly shaped, the array may have an arrangement that differs than what is illustrated (e.g., including more or less pixels, rows, and columns). In one implementation, a first set of the black pixels 206 are utilized in the first phase calibration, and a second set of the black pixels 206 are utilized in the second phase calibration.

Figure 3:
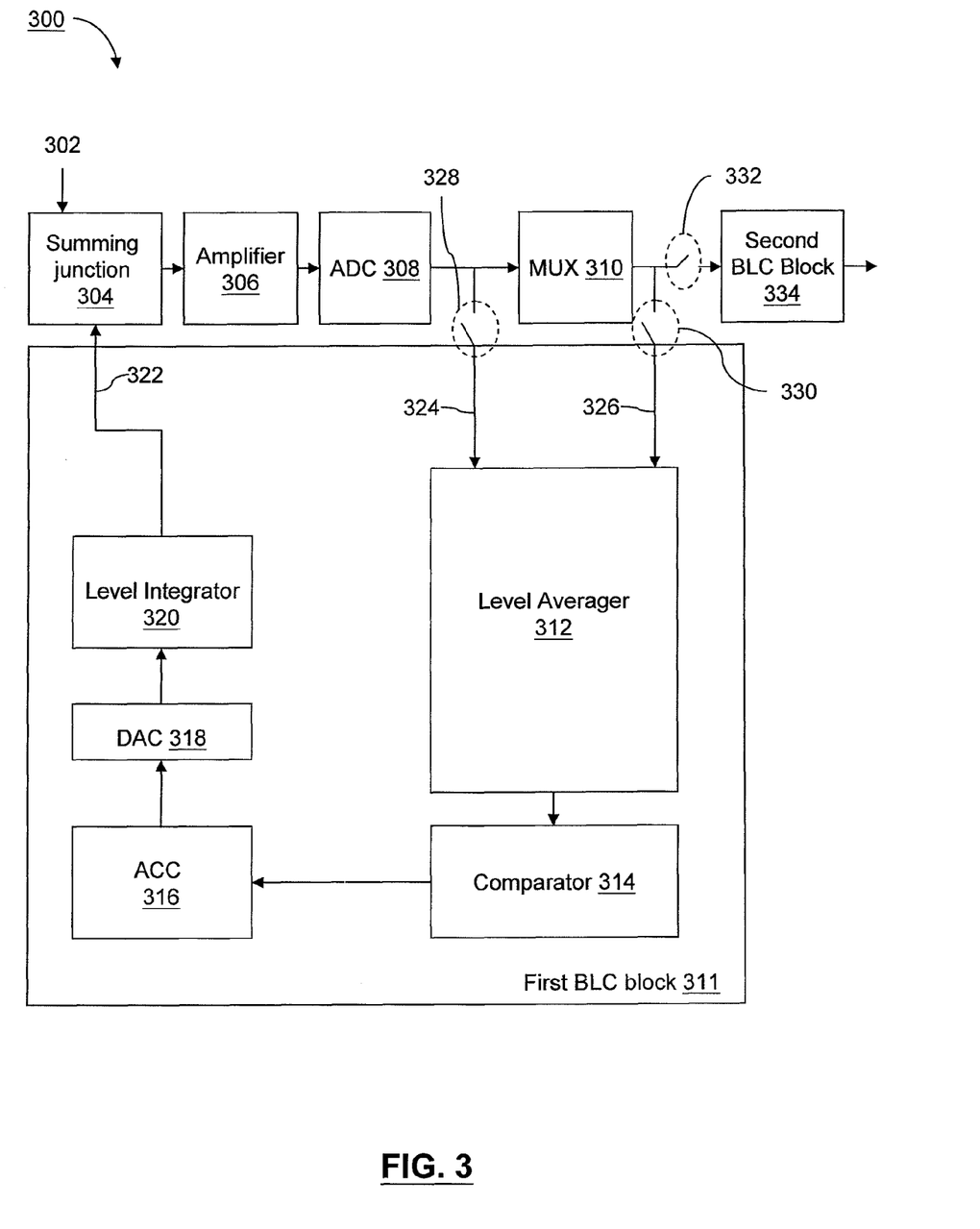
FIG. 3 is a simplified block diagram illustrating an example front-end processing block, according to one embodiment of the present invention.

FIG. 3 is a simplified block diagram illustrating an example front-end processing block 300, according to one embodiment of the present invention. The front-end processing block 300 includes a summing junction 304, one or more amplifiers 306, one or more ADCs 308, a multiplextor (MUX) 310, a first BLC block 311, and a second BLC block 334. The summing junction 304 is configured to receive a source signal 302 from a pixel sensor array, which may include a black level signal and an image signal, and a first calibration signal 322 from the first BLC block 311. The black level signal is a read-out from black pixels, such as the black pixels 206 of FIG. 2, and the image signal is an output from the R/G/B active pixels corresponding to a captured image and also shown in FIG. 2. The output of the summing junction 304 is further adjusted by the amplifier 306 to better utilize the range supported by the ADC 308 and to reduce quantization noises. The ADC 308 is configured to output a digital signal corresponding to the adjusted analog output signal from the amplifier 306. In one implementation, the front-end processing block 300 includes multiple amplifiers 306 and ADCs 308 to support multiple color channels. The MUX 310 may be configured to select a digital signal outputted from one of such ADCs 308 to forward to either the first BLC block 311 or the second BLC block 334.

In one implementation, the first BLC block 311 is configured to adjust the received black level signal during a certain calibration period to generate a calibrated black level signal (e.g., the first calibration signal 322). There may be one or more paths (e.g., paths 324 and 326) for the first BLC block 311 to receive the black level signal. In one implementation, the paths 324 and 326 are controlled by one or more switches, such as a switch 328, a switch 330, and a switch 332. The switches may be controlled by one or more timing signals asserted by a timing generator (e.g., the timing generator 110 of FIG. 1). When the switch 328 is closed and the switch 330 and switch 332 are opened, the output of the ADC 308 is directed to the first BLC block 311 via the path 324 without going through the MUX 310. On the other hand, when the switch 328 and the switch 332 are opened and the switch 330 is closed, the output of the MUX 310 is directed to the first BLC block 311 via the path 326. In other words, when the path 326 is enabled, any offset that the MUX 310 may have introduced to the output of the ADC 308 is accounted for in the calibration. In one implementation, when the path 324 or the path 326 is enabled, the calibration of the received black level signal performed by the first BLC block 311 corresponds to a first phase calibration. The first BLC block 311 may be configured to process a first set of the black pixels.

When the switch 332 is closed and the switch 328 and the switch 330 are opened, the additional calibration performed by the second BLC block 334 corresponds to a second phase calibration. In one implementation, the second phase calibration occurs after the completion of the first phase calibration, and the second BLC block 334 may be configured to operate on a second set of the black pixels (e.g., the remaining black pixels not processed in the first phase calibration.)

The first BLC block 311 may include a level averager 312, a comparator 314, an accumulator (ACC) 316, a digital-to-analog converter (DAC) 318, and a level integrator 320. In one implementation, the level averager 312 is configured to filter, add, and average a set of digital values corresponding to a set of adjusted black level signals. This set of adjusted black level signals may be associated with a first subset of the first set of black pixels to be operated on in the first phase calibration. This set of digital values may also be associated with different color channels. The level averager 312 is also configured to send the resulting averaged value to the comparator 314 for further processing. The ACC 316 is configured to process the output of the comparator 314 and output a calibration offset. After having converted the calibration offset back to an analog signal by the DAC 318, the level integrator 320 is configured to prepare the first calibration signal 322 based on the calibration offset. The first calibration signal 322 is fed back to the summing junction 304, so that the summing junction 304 may apply the first calibration signal 322 to a second subset of the first set of black pixels, resulting in a second set of adjusted black level signals. In other words, the level average 312 is configured to operate on a new set of digital values corresponding to the second set of adjusted black level signals. The operations in the first phase calibration discussed above are repeated until a predetermined condition is met. One example predetermined condition may be to identify a calibration signal, so that a set of black level signals adjusted by the calibration signal can be determined to have reached a target black level. Another example predetermined condition may be that the first set of black pixels has all been processed.

Unlike the first BLC block 311, the second BLC block 334 may be configured to support a feed-forward mechanism, in which the second phase calibration is performed one time based on the second set of the black pixels that are not processed in the first phase calibration to generate a second calibration signal to be applied to an image signal. The second BLC block 334 may also output the adjusted image signal to an image processing block, such as the image processing block 124 of FIG. 1.

In one implementation, the bit resolution supported by the DAC 318 may differ from the bit resolution supported by the ADC 308. For example, the DAC 318 may receive a 10-bit digital value but output an analog signal corresponding to an 8-bit resolution. The ADC 308 may then convert this analog signal, which may be further adjusted and amplified, to a 10-bit digital value. Additional details of the front-end processing block 300 and the two BLC blocks will be further described in the following paragraphs.

Figure 4:
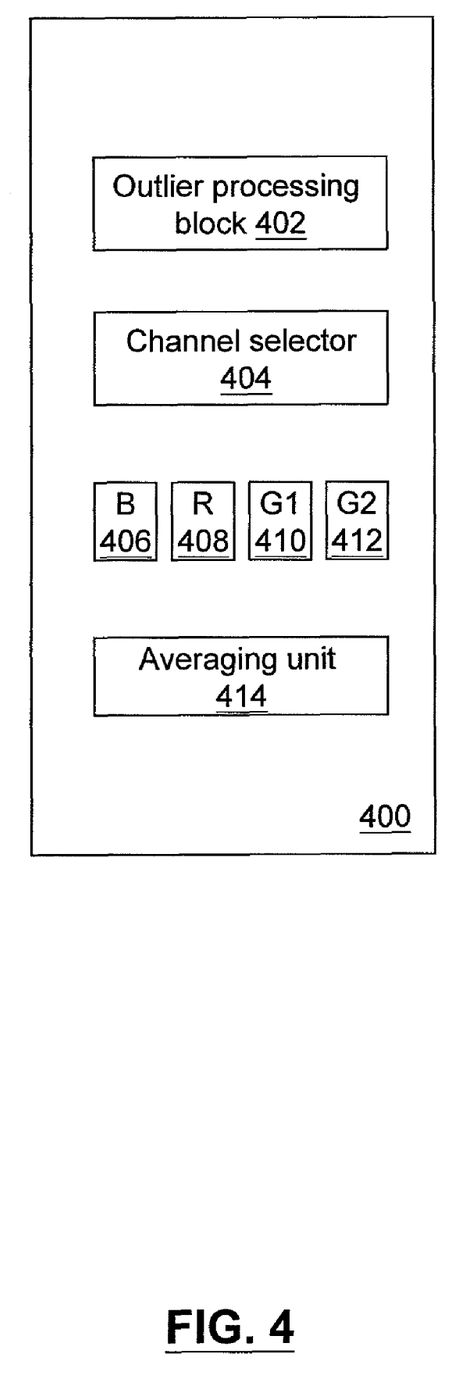
FIG. 4 is a simplified block diagram of a level averager, according to one embodiment of the present invention.

FIG. 4 is a simplified block diagram of a level averager 400, according to one embodiment of the present invention. In one implementation, the level averager 400 may correspond to level average 312 of FIG. 3. The level averager 400 may include an outlier processing block 402, a channel selector 404, a B-pixel channel 406, an R-pixel channel 408, a G1-pixel channel 410, a G-2 pixel channel 412, and one or more averaging units 414.

In one implementation, the outlier processing block 402 is configured to identify a presence of an outlier in the digital signal received by the level averager 400. The outlier generally refers to a digital value that significantly deviates from the rest of the digital values in the digital signal received by the level averager 400. For example, when a sequence of digital values of 200, 208, 195, 198, 210, 600, and 193 is received by the level averager 400, the digital value of 600 may be the outlier based on a threshold value accessible by the outlier processing block 402. In other words, the outlier processing block 402 may be configured to compare the received digital values with the threshold value to identify and filter out the outliers.

After the outliers are identified and filtered out from the received digital values, the channel selector 404 in one implementation is configured to select the filtered digital values associated with one or more color channels based on the pixel color or the pixel position to output to the averaging units 414. To illustrate, in one example, the filtered B pixels, such as P1, P3, P5, P7, P17, P19, P21, and P23 shown in FIG. 2, associated with the B-pixel channel 406 are selected to be outputted to the averaging unit 414. The filtered R pixels, such as P10, P12, P14, P16, P26, P28, P30, and P32 also shown in FIG. 2, associated with the R-pixel channel 408 are also outputted to the averaging unit 414. The filtered G1 pixels, such as P2, P9, P6, P13, P18, P25, P22, and P29 shown in FIG. 2, associated with the G1-pixel channel 410 are outputted to the averaging unit 414. The filtered G2 pixels, such as P4, P11, P8, P15, P20, P27, P24, and P31 shown in FIG. 2, associated with the G2-pixel channel 412 are outputted to the averaging unit 414. In another example, the channel selector 404 may be configured to select both the filtered B pixels associated with the B-pixel channel 406 and the filtered R pixels associated with the R-pixel channel 408 to output to the averaging unit 414. Also, the channel selector 404 may also be configured to select both the filtered G1 pixels associated with the G1-pixel channel 410 and the filtered G2 pixels associated with the G2-pixel channel 412 to output to the averaging unit 414. In still another example, the channel selector 404 may be configured not to select any color channel based on either the pixel color or the pixel position and may instead direct all the filtered digital values to the averaging unit 414.

The averaging unit 414 is configured to add and average the one or more filtered digital values. In one implementation, multiple averaging units 414 may be configured to independently operate on the filtered digital values associated with the multiple selected color channels. For example, there may be four averaging units 414, and each of the four averaging units 414 may be configured to independently operate one of the filtered B pixels associated with the B-pixel channel 406, the filtered R pixels associated with the R-pixel channel 408, the filtered G1 pixels associated with the G1-pixel channel 410, and the filtered G2 pixels associated with the G2-pixel channel 412. The resulting averaged values associated with the one or more selected color channels are sent to a comparator, such as the comparator 314 of FIG. 3, for further processing.

Figure 5A:
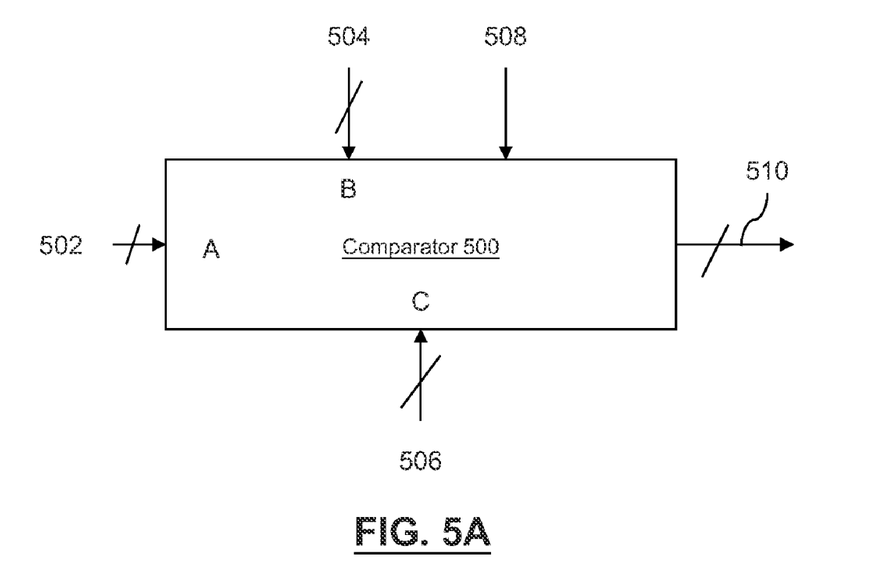
FIG. 5A is a schematic diagram illustrating an example comparator, according to one embodiment of the present invention.

FIG. 5A is a schematic diagram illustrating an example comparator 500, according to one embodiment of the present invention. In one implementation, the comparator 500 may correspond to the comparator 314 of FIG. 3. The comparator 500 receives an input signal 502, a target black level 504, a black level ceiling 506, and a reset signal 508. The input signal 502 may correspond to the output of a level averager, such as the level averager 312 of FIG. 3. The target black level 504 may be set during initialization and may be modified depending on different lighting conditions. The black level ceiling 506, which may be used to dampen the system response to potentially varying black levels, may be programmable and may be represented in 8 bits to reduce power consumption. In one implementation, the comparator 500 is reset via the reset signal 508 when a new frame starts. A timing generator, such as the timing generator 108, may assert the reset signal 508.

Figure 5B:
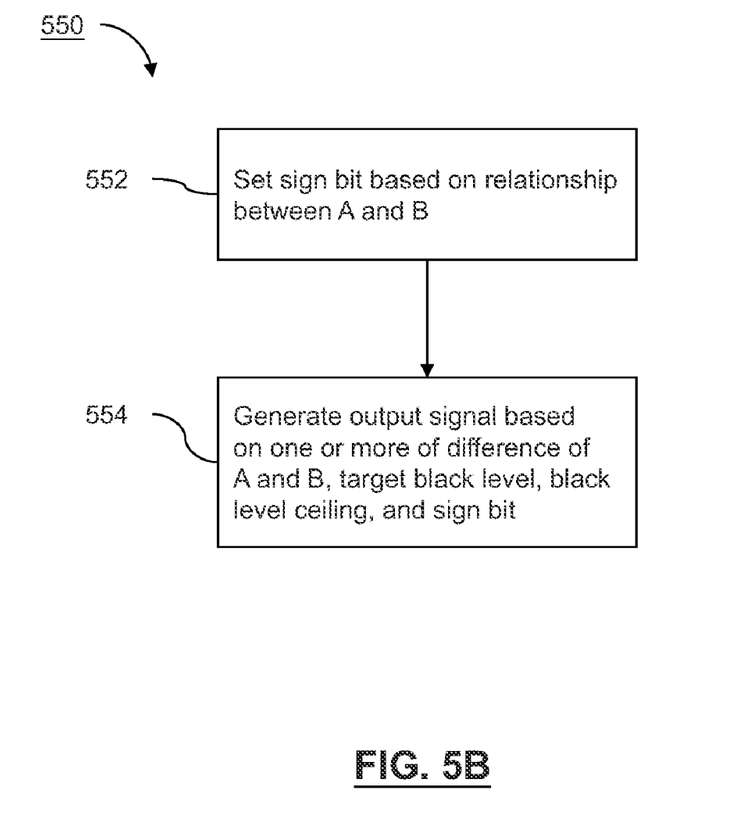
FIG. 5B is a flow chart illustrating a process performed by the comparator of FIG. 5A to generate an output signal, according to one embodiment of the present invention.

FIG. 5B is a flow chart illustrating a process 550 performed by the comparator 500 to generate an output signal 510, according to one embodiment of the present invention. For illustration, one example output signal 510 is represented by 9 bits and is also referred to as output_signal[8:0] in the following paragraphs. In operation 552, a sign bit is set based on the relationship between the input signal 502, which may correspond to the averaged digital value of multiple pixels, and the target black level 504. For example, if the input signal 502 is less than the target black level 504 (e.g., A<B), the sign bit may be set to 1 (i.e., output_signal[8]=1). Otherwise (e.g., A>=B), the sign bit may be set to 0 (i.e., output_signal[8]=0). In operation 554, the output signal 510 is generated based on one or more of the difference between the input signal 502 and the target black level 504, the black level ceiling 506, and the sign bit. For example, if the absolute difference between the input signal 502 and the target black level 504 is greater than the black level ceiling 506 (e.g., |A−B|>C), then the output signal 510 is the combination of the sign bit and the black level ceiling 506 (e.g., output_signal[8] corresponds to the sign bit, and output_signal[7:0] is represented by the black level ceiling 506). On the other hand, if the absolute difference between the input signal 502 and the target black level 504 is less than or equal to the black level ceiling 506 (e.g., |A−B|<=C), then the output signal 510 is the combination of the sign bit and the absolute difference.

In one implementation, each comparator 500 is configured to process the averaged digital value of the filtered pixels that are associated with a particular color channel. In other words, suppose there are four color channels, such as a B-pixel channel, an R-pixel channel, a G1-pixel channel, and a G2-pixel channel. Four comparators 500 may be adapted to process the four color channels.

Figure 6A:
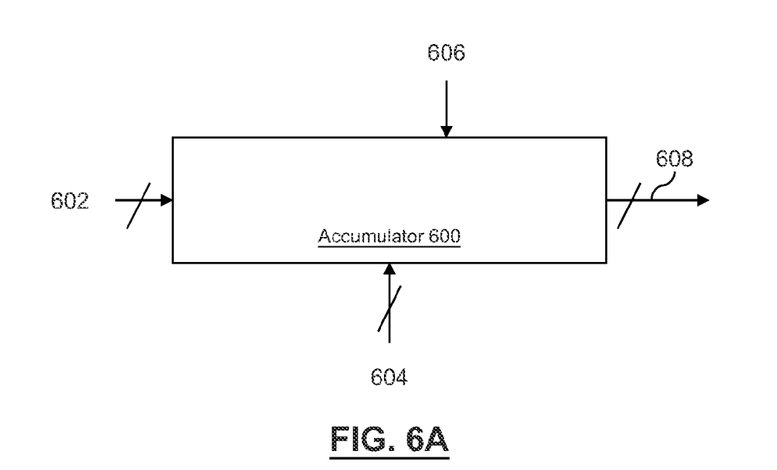
FIG. 6A is a schematic diagram illustrating an example accumulator, according to one embodiment of the present invention.

FIG. 6A is a schematic diagram illustrating an example accumulator 600, according to one embodiment of the present invention. In one implementation, the accumulator 600 may correspond to the accumulator 316 of FIG. 3. The accumulator 600 receives a black level value 602, an accumulator step 604, and a reset signal 606. The black level value 602 may correspond to the output signal 510 of FIG. 5. The accumulator step 604 may be a dynamically changing integer number, and the accumulator 600 may reset via the reset signal 606 when a new frame starts. A timing generator, such as the timing generator 108 of FIG. 1, may assert the reset signal 606. Based on the received signals, the accumulator 600 is configured to generate a calibration offset 608.

Figure 6B:
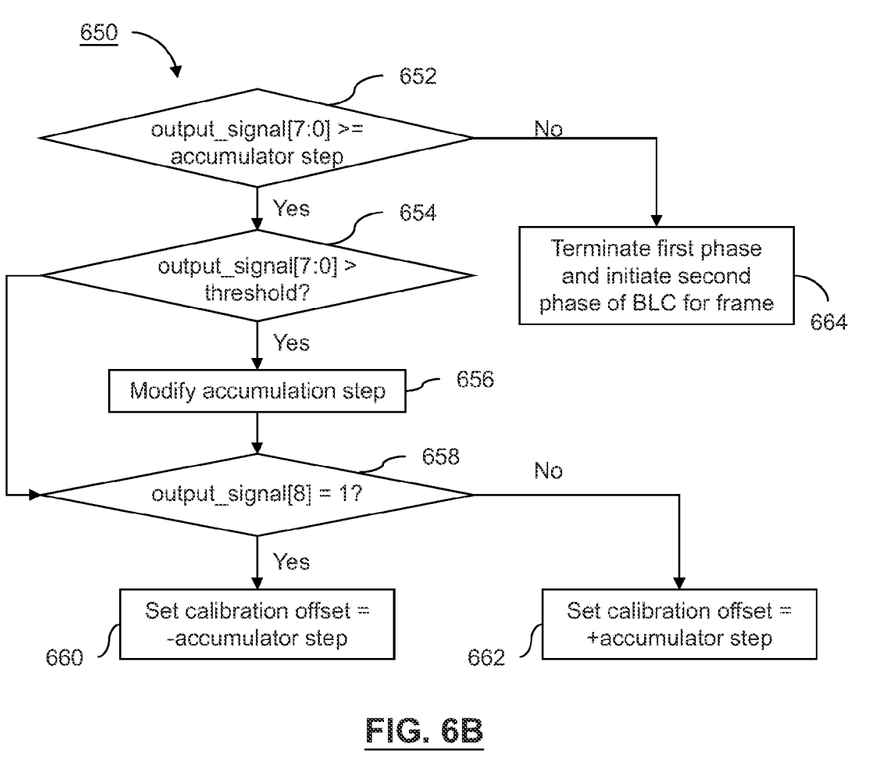
FIG. 6B is a flow chart illustrating a process performed by the accumulator of FIG. 6A to generate the calibration offset, according to one embodiment of the present invention.

FIG. 6B is a flow chart illustrating a process 650 performed by the accumulator 600 to generate the calibration offset 608 in a first phase calibration, according to one embodiment of the present invention. In operation 652, if the output_signal [7:0] (i.e., a part of the black level value 602) from a comparator, such as the comparator 314 of FIG. 3, is greater than or equal to the accumulator step 604, then the output_signal [7:0] is compared against a threshold to determine whether the black level value 602 is still far away from a black level target supported by the comparator. If the output_signal[7:0] is greater than the threshold, then the accumulator step 604 is modified in operation 656 in an attempt to speed up the convergence of the calibration, and the calibration offset 608 is generated based on the sign bit (i.e., output_signal[8]) and the modified accumulator step 604. Otherwise, the accumulator step 604 is not modified, and the calibration offset 608 is generated based on the sign bit and the unmodified accumulator step 604. Specifically, if the sign bit is 1 as determined in operation 658, then the calibration offset 608 is set to be the negative accumulator step 604 (i.e., —accumulator step 604) in operation 660. Otherwise, the calibration offset 608 is set to be just the accumulator step 604 in operation 662. If the output_signal[7:0] is less than the accumulator step 604, then in operation 664, the first phase calibration is terminated, and a second phase calibration is initiated for the current frame.

In one implementation, the generated calibration offset 608 is sent to a DAC to be converted to an analog signal, and the converted calibration offset 608 is then processed by a level integrator to generate a first calibration signal. The DAC and the level integrator may correspond to the DAC 318 and the level integrator 320 shown in FIG. 3.

Figure 7:
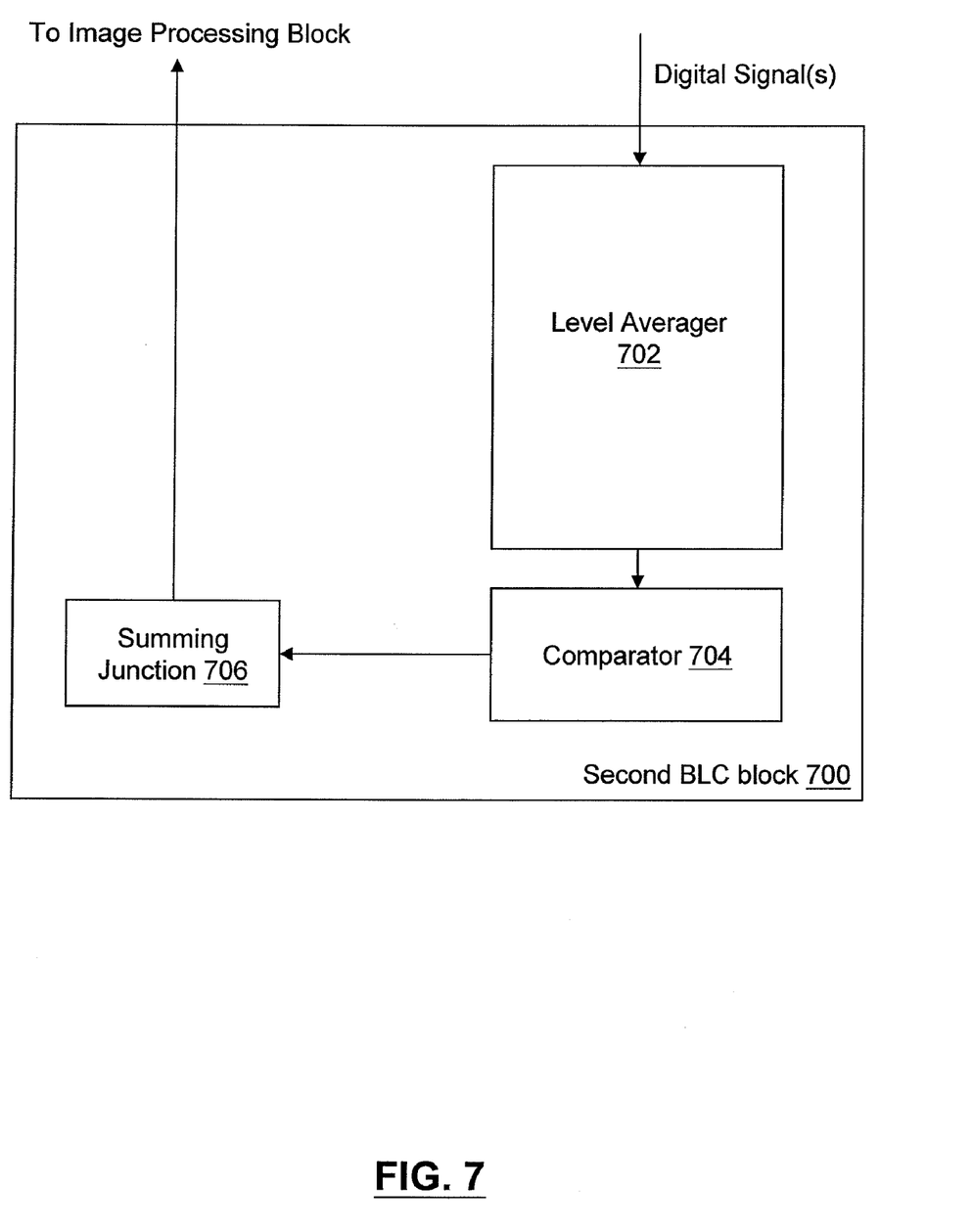
FIG. 7 is a simplified block diagram of an example second BLC block, according to one embodiment of the present invention.

FIG. 7 is a simplified block diagram of an example second BLC block 700, according to one embodiment of the present invention. In one implementation, the second BLC block 700 may correspond to the second BLC block 334 of FIG. 3. The second BLC block 700 may include a level averager 702, a comparator 704, and a summing junction 706.

Similar to the level averager 312 of FIG. 3, the level averager 702 in the second BLC block 700 may be configured to filter, add, and average the one or more received digital values associated with the one or more selected color channels. However, the level averager 702 may be configured to operate on the one or more filtered digital values corresponding to the second set of the black pixels, which are not operated on in the first phase calibration but are adjusted based on the results from the first phase calibration. To illustrate, suppose P1 to P16 shown in FIG. 2 correspond to the first set of the black pixels 206, and P17 to P32 correspond to the second set of the black pixels 206. In the first phase calibration, the black pixels P17 to P32 are not involved, but a first calibration signal based on the first set of black pixels P1 to P16 is generated. In the second phase calibration, the first calibration signal is applied to the black pixels P17 to P32 before the adjusted black level signals associated with the black pixels P17 to P32 reach the second BLC block 700. In one implementation, the level averager 702 is configured to add and average the adjusted black level signals for each of the color channels supported by the second BLC block 700 independently. In other words, the adjusted black level signal associated with the B-pixel channel, such as P17, P19, P21, and P23, may be filtered, added, and averaged to generate a B-pixel average value. Similarly, the adjusted black level signal associated with the R-pixel channel, the adjusted black level signal associated with the G1-pixel channel, and the adjusted black level signal associated with the G-2 pixel channel may also be filtered, added, and averaged independently to generate an R-pixel average value, a G1-pixel average value, and a G2-pixel average value, respectively. The averaged values may be directed to the comparator 704.

In one implementation, the comparator 704 is configured to compare the one or more received average values against a target black level, which may be the same target black level supported by the comparator in the first BLC block (e.g., the comparator 314 of the first BLC block 311), and output a second calibration signal. Multiple comparators 704 may be configured to independently operate on the multiple average values associated with the different color channels. Suppose there are four comparators 704, each is responsible for the average value associated with a particular color channel. Using the B-pixel channel as an illustration, the output of one comparator 704 may be based on the difference between the target black level and the B-pixel average value. If the B-pixel average value is greater than the target black level by 2, then the comparator 704 may be configured to output −2 in the second calibration signal to the summing junction 706 to compensate for the still high B-pixel average value. On the other hand, if the B-pixel average value is less than the target black level by 1, then the comparator 704 may be configured to output +1 in the second calibration signal to the summing junction 706 to compensate for the still low B-pixel average value.

The summing junction 706 may be configured to apply the received second calibration signal to an image signal and output the adjusted image signal to an image processing block (e.g., the image processing block 124 of FIG. 1). In one implementation, the operations supported by the summing junction 706 are performed in the digital domain.

Figure 8:
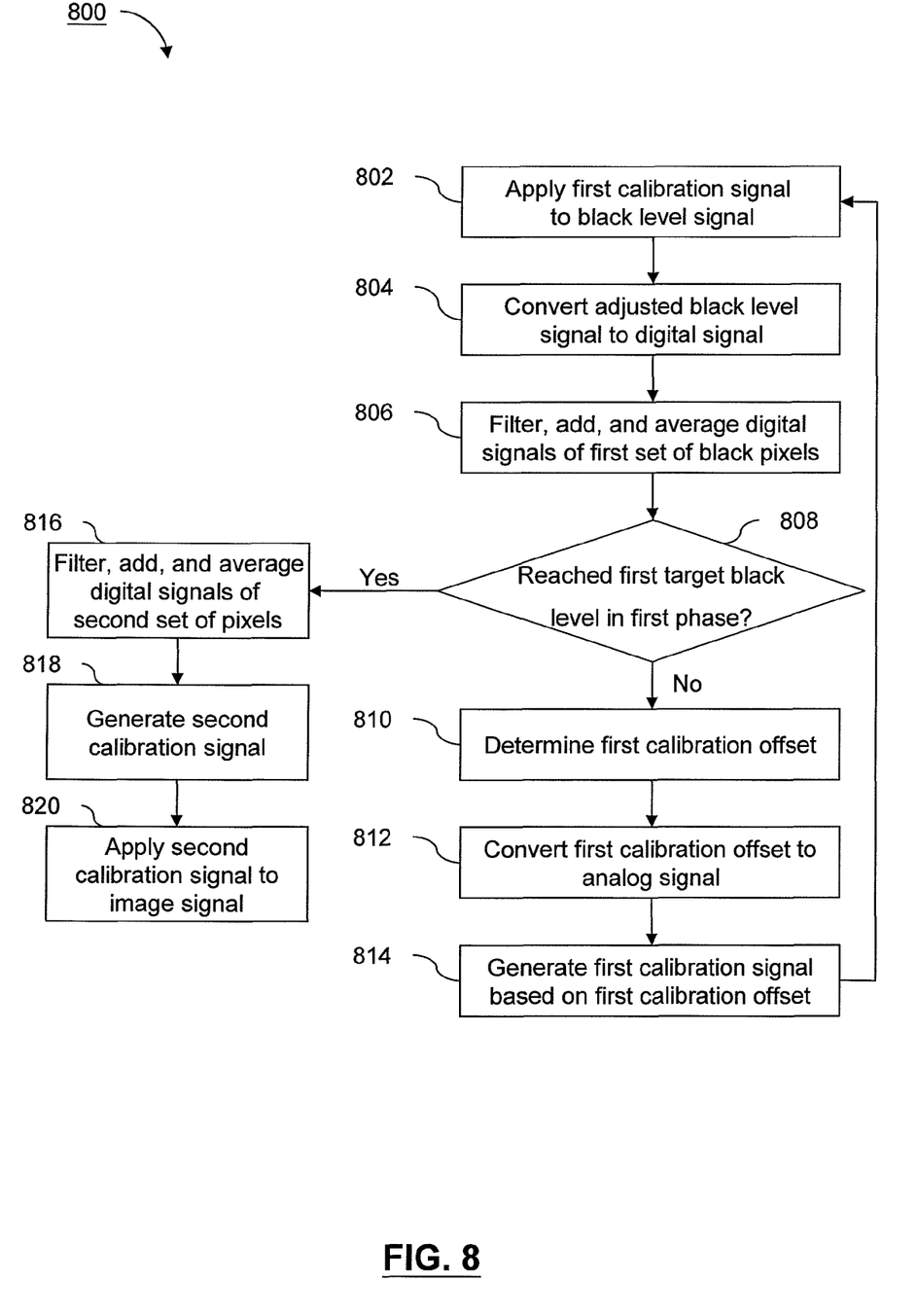
FIG. 8 is a flow chart illustrating a process for performing multi-phase black level calibration, according to one embodiment of the present invention.

FIG. 8 is a flow chart illustrating a process 800 for performing multi-phase black level calibration, according to one embodiment of the present invention. In one implementation, the process 800 may be carried out by an image sensor, such as the image sensor 100 shown in FIG. 1. Also, operations 802 to 814 may be considered as the operations of a first phase calibration, and operations 816 to 820 may be considered as the operations of a second phase calibration. During a black level calibration period in a frame, in operation 802, a first calibration signal is applied to a black level signal in a source signal. The adjusted black level signal is converted to a digital signal in operation 804, and the digital values of multiple pixels are filtered, added, and averaged in operation 806. In one implementation, the filtering, adding, and averaging operations in 806 are carried out for the digital values associated with a color channel. In operation 808, a predetermined condition is checked to see if it has been met. As an example, the predetermined condition may be to check whether the averaged value resulting from operation 806 is deemed to have reached a target black level. Thus, if the target black level is determined not to have been reached, then the predetermined condition is not met, and the averaged value is further processed in operation 810 to determine a first calibration offset. The first calibration offset is converted back to an analog signal in operation 812, and the analog signal is utilized to generate a first calibration signal in operation 814. The calibration loop for the first phase calibration continues during the black level calibration period in the frame, until the predetermined condition in operation 808 is determined to have been met (e.g., the target black level target is determined to have been reached.) Then, the first phase calibration is terminated, and the second phase calibration begins in operation 816. In another example, the predetermined condition may correspond to whether all of the first set of black pixels in the frame has been processed.

In the second phase calibration, the first calibration signal generated in the first phase calibration is applied to the second set of black pixels in the frame. In operation 816, the digital values associated with the second set of adjusted black level signals are filtered, added, and averaged. By comparing the average value of the filtered digital values to a second target black level, a second calibration signal is generated in operation 818 to further fine tune the calibration results of the first phase calibration. In operation 820, the second calibration signal is applied to the image signal of the source signal in the frame.

While the foregoing is directed to embodiments of the present invention, other and further embodiments of the present invention may be devised without departing from the basic scope thereof. The above examples, embodiments, and drawings should not be deemed to be the only embodiments, and are presented to illustrate the flexibility and advantages of the present invention as defined by the following claims.

We claim:
1. A method for calibrating a black level signal in a frame having a first set of black pixels and a second set of black pixels, comprising:
performing an iteration of
filtering out an outlier from a first set of digital values corresponding to a first set of adjusted black level signals, wherein the first set of adjusted black level signals are associated with a first subset of the first set of black pixels,
calculating a first average value based on the first set of filtered digital values,
determining whether to modify an accumulator step based on the first average value and a first target black level,
determining a calibration offset based on the accumulator step and a difference between the first average value and the first target black level, and
generating a first calibration signal based on the calibration offset for a second subset of the first set of black pixels; and
repeating the iteration for the first set of black pixels until a predetermined condition is met.
2. The method of claim 1, further comprising:
filtering out an outlier from a second set of digital values corresponding to a second set of black level signals, wherein the second set of black level signals are associated with the second set of black pixels and are adjusted by the first calibration signal;
calculating a second average value based on the second set of filtered digital values;
generating a second calibration signal based on a difference between the second average value and a second target black level; and
applying the second calibration signal to an image signal associated with one or more active pixels in the frame.
3. The method of claim 2, wherein the first set of digital values are associated with a color channel, and the second set of digital values are associated with the color channel.
4. The method of claim 1, wherein the determining whether to modify an accumulator step further comprises increasing a size of the accumulator step when the first average value exceeds the first target black level by more than a threshold value.
5. The method of claim 1, wherein the determining a calibration offset is further based on a black level ceiling.
6. The method of claim 1, further comprising:
converting the calibration offset to an analog signal; and
accumulating the analog signal in each of the iteration to generate the first calibration signal.
7. The method of claim 6, wherein the converting the calibration offset further comprises receiving the calibration offset in a first bit resolution and outputting the analog signal corresponding to a second bit resolution.

8. The method of claim 2, wherein the first target black level is the same as the second target black level.

9. A front-end processing block having a first black level calibration (BLC) block and a second BLC block configured to process a black level signal in a frame with a first set of black pixels and a second set of black pixels, the first BLC block comprising:
- a first level averager configured to filter out an outlier from a first set of digital values corresponding to a first set of adjusted black level signals and then calculate a first average value based on the first set of filtered digital values, wherein the first set of adjusted black level signals are associated with a first subset of the first set of black pixels;
- a first comparator configured to generate an output signal based on a difference between the first average value and a first target black level;
- an accumulator configured to determine whether to modify an accumulator step based on the output signal and to determine a calibration offset based on the output signal and the accumulator step;
- a digital-to-analog converter (DAC) configured to convert the calibration offset to an analog signal;
- a level integrator configured to generate a first calibration signal based on the analog signal and send the first calibration signal to a first summing junction to be applied to a second subset of the first set of black pixels; and
- the first BLC block is configured to continue processing the black level signal in the frame until a predetermined condition is met in a first phase calibration.

10. The front-end processing block of claim 9, wherein the second BLC block comprises
- a second level averager configured to filter out an outlier from a second set of digital values corresponding to a second set of black level signals and then calculate a second average based on the second set of filtered digital values, wherein the second set of black level signals are associated with the second set of black pixels and are adjusted by the first calibration signal; and
- a second comparator configured to generate a second calibration signal based on a difference between the second average value and a second target black level and send the second calibration signal to a second summing junction to be applied to an image signal associated with one or more active pixels in the frame in a second phase calibration.

11. The front-end processing block of claim 9, wherein the first level averager further comprises
- a first averaging unit associated with a first color channel;
- a second averaging unit associated with a second color channel; and
- a channel selector, wherein the channel selector is configured to select a first subset of the first set of filtered digital values associated with the first color channel and a second subset of the first set of filtered digital values associated with the second color channel to output to the first averaging unit and the second averaging unit, respectively.

12. The front-end processing block of claim 9, wherein the first comparator is further configured to increase a size of the accumulator step when the first average value exceeds the first target black level by more than a threshold value.

13. The front-end processing block of claim 9, wherein the first comparator is configured to generate the output signal further based on a black level ceiling.

14. The front-end processing block of claim 9, wherein the level integrator is configured to accumulate the analog signal from processing the black level signal in the frame in the first phase calibration.

15. The front-end processing block of claim 9, wherein the DAC is configured to receive the calibration offset in a first bit resolution and output the analog signal corresponding to a second bit resolution.

16. The front-end processing block of claim 10, wherein the first target black level is the same as the second target black level.

17. An image sensor configured to perform multi-phase black level calibration (BLC) in a frame, the image sensor comprising:
- a pixel sensor array configured to output a first set of black pixels and a second set of black pixels in the frame;
- a timing generator; and
- a front-end processing block having a first summing junction, a first BLC block, and a second BLC block, wherein
  - in response to a first timing signal asserted by the timing generator, the first BLC block is configured to iteratively generate a first calibration signal in a first phase calibration based on a first set of adjusted black level signals associated with the first set of black pixels, a changing accumulator step, and a predetermined condition associated with a first target black level, and
  - in response to a second timing signal asserted by the timing generator, the second BLC block is configured to generate a second calibration signal for a second summing junction to apply to one or more active pixels in the frame in a second phase calibration based on a second target black level and a second set of black level signals associated with the second set of black pixels, wherein the second set of black level signals are adjusted by the first calibration signal and are filtered.

18. The image sensor of claim 17, wherein the first BLC block comprises
- a first level averager configured to filter out an outlier from a first set of digital values corresponding to the first set of adjusted black level signals and then calculate a first average value based on the first set of filtered digital values, wherein the first set of adjusted black level signals are associated with a first subset of the first set of black pixels;
- a first comparator configured to generate an output signal based on a difference between the first average value and the first target black level;
- an accumulator configured to determine whether to modify an accumulator step based on the output signal and to determine a calibration offset based on the output signal and the accumulator step;
- a digital-to-analog converter (DAC) configured to convert the calibration offset to an analog signal;

a level integrator configured to generate a first calibration signal based on the analog signal and send the first calibration signal to the first summing junction to be applied to a second subset of the first set of black pixels; and the first BLC block is configured to continue processing the black level signal in the frame until the predetermined condition is met.

19. The image sensor of claim 18, wherein the second BLC block comprises a second level averager configured to filter out an outlier from a second set of digital values corresponding to the second set of black level signals and then calculate a second average based on the second set of filtered digital values; and a second comparator configured to generate the second calibration signal based on a difference between the second average value and the second target black level and send the second calibration signal to the second summing junction to be applied to one or more active pixels in the frame.

20. The image sensor of claim 17, wherein the timing generator is configured to assert the second timing signal after the first phase calibration is completed.

* * * * *